United States Patent [19]
Gohl et al.

[11] Patent Number: 5,673,989
[45] Date of Patent: *Oct. 7, 1997

[54] WIRELESS, REMOTE-CONTROLLED PORTABLE SEARCHLIGHT

[76] Inventors: Gerald Lee Gohl, Rte. 61, Box 40, Hayes Center, Nebr. 69032; Albert W. Gebhard, 2101 E. Alameda, Denver, Colo. 80209

[*] Notice: The term of this patent shall not extend beyond the expiration date of Pat. No. 5,490,046.

[21] Appl. No.: 307,301

[22] Filed: Sep. 16, 1994

Related U.S. Application Data

[63] Continuation-in-part of Ser. No. 201,551, Feb. 23, 1994, Pat. No. 5,490,046.
[51] Int. Cl.$^6$ ........................................... F21V 21/30
[52] U.S. Cl. .................... 362/35; 362/286; 362/418; 362/74; 362/397
[58] Field of Search ........................ 362/233, 61, 74, 362/83.3, 285, 286, 287, 397, 419, 428, 35, 398, 382, 66; 248/205.5, 311.2, 316.2

[56] References Cited

U.S. PATENT DOCUMENTS

| | | | |
|---|---|---|---|
| 2,783,367 | 2/1957 | Locke | 362/397 |
| 3,936,670 | 2/1976 | Allen, Sr. | 362/397 |
| 4,229,781 | 10/1980 | Hitora | 362/397 |
| 4,238,816 | 12/1980 | Merlo | 362/397 |
| 4,353,110 | 10/1982 | Ellis | 362/35 |
| 4,712,167 | 12/1987 | Gardin et al. | 362/233 |
| 4,779,168 | 10/1988 | Montgomery | 362/233 |
| 4,890,207 | 12/1989 | Jones | 362/286 |
| 4,935,855 | 6/1990 | Narita | 362/428 |
| 4,981,363 | 1/1991 | Lipman | 362/68 |

*Primary Examiner*—Thomas M. Sember
*Attorney, Agent, or Firm*—John E. Reilly

[57] ABSTRACT

A portable searchlight is described which includes an upper lamp housing, a lower base support unit and a releasable attachment device to releasably attach the base support unit to another surface, such as, the roof of a motor vehicle. The lamp housing can be tilted or rotated by wireless remote control either from the interior of the vehicle or from a location away from the vehicle. The releasable attachment device is such that the apparatus can be secured by a suction cup or by placing the base support unit in a shoe which is anchored to another surface.

13 Claims, 4 Drawing Sheets

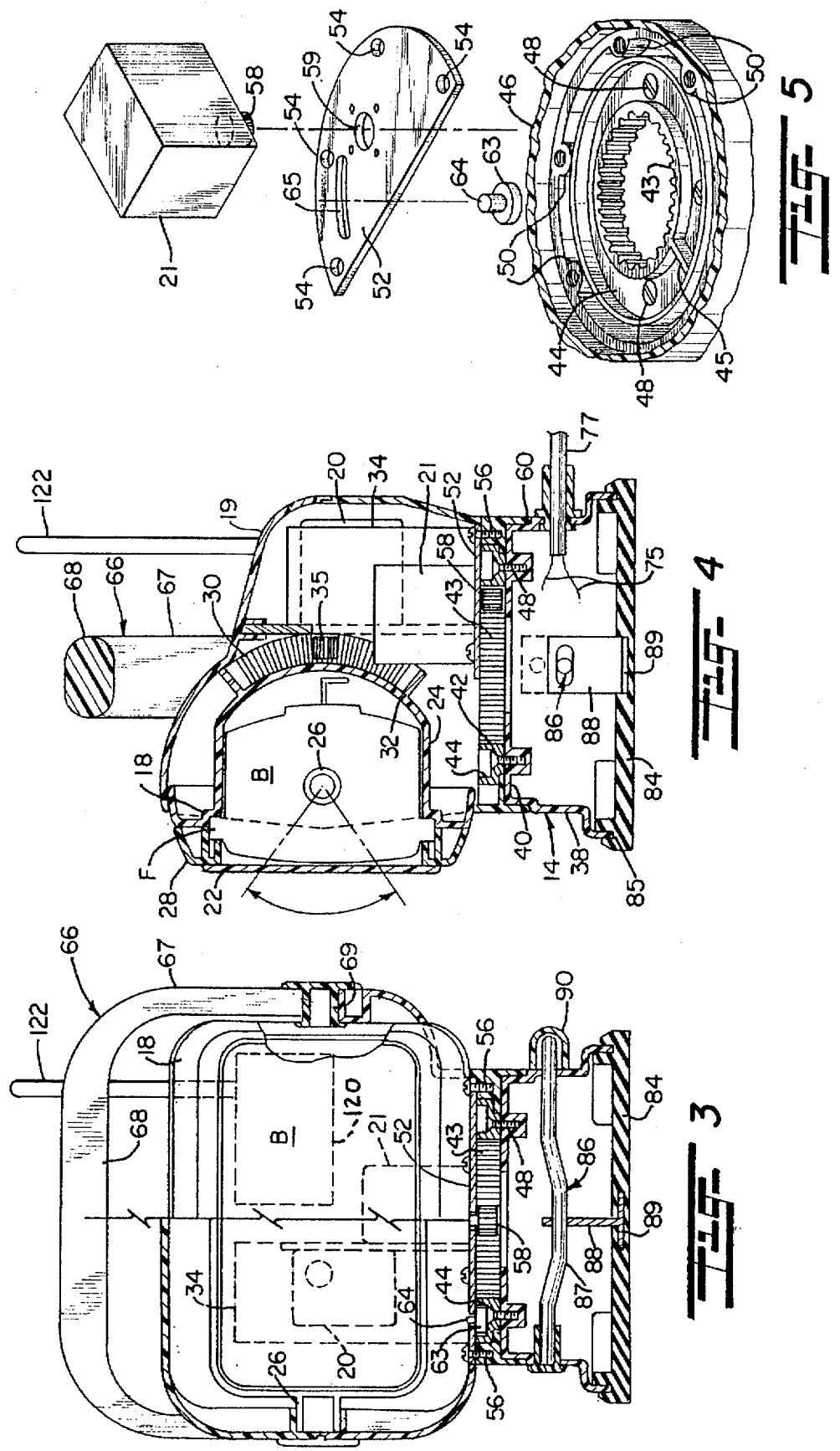

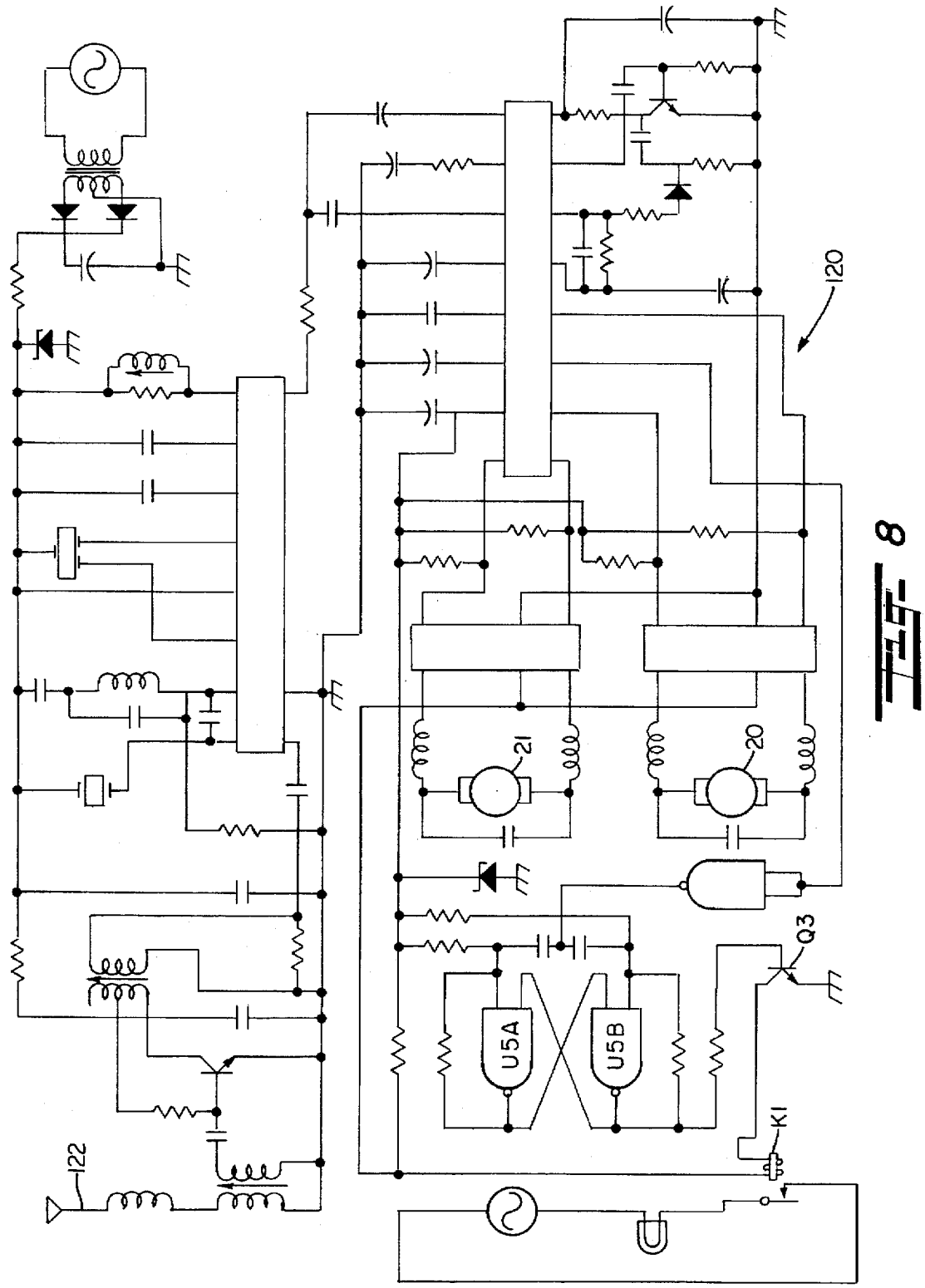

5,673,989

WIRELESS, REMOTE-CONTROLLED PORTABLE SEARCHLIGHT

CROSS-REFERENCE TO RELATED APPLICATIONS

This application is a continuation-in-part of Ser. No. 201,551, filed 23 Feb., 1994, now U.S. Pat. No. 5,490,046, for PORTABLE REMOTE-CONTROLLED SEARCHLIGHT APPARATUS, invented by Gerald Lee Gohl and Albert W. Gebhard.

BACKGROUND AND FIELD OF INVENTION

This invention relates to lighting apparatus; and more particularly relates to a novel and improved searchlight which can be removably mounted on a surface, such as, the roof of a motor vehicle and controlled from either inside or outside of the vehicle to undergo sweeping movement in both horizontal and vertical directions.

Searchlights of the type that can be mounted on motor vehicles, boats and other installations are in widespread use. Typically, the searchlights are so designed as to permit vertical or horizontal sweeping movement as well as to regulate the intensity or type of light beam. Representative of such apparatus are U.S. Pat. No. RE 29,266 to L. E. Hessemer et al and U.S. Pat. No. 4,930,057 to J. L. Williams. In each, the searchlight apparatus is placed in a housing which has motor-driven gears to regulate horizontal and vertical sweeping movement of the searchlight, and an electrical cable extends from the housing into a remote-control box which can be placed inside of the vehicle to permit the vehicle operator to switch the light on and off as well as to activate and deactivate the drive motors. However, searchlights as disclosed in those patents require permanent mounting or attachment to the exterior of the vehicle and are readily susceptible to damage, for example, from low overhanging branches, vandalism and theft.

Although searchlights are becoming increasingly popular for civilian use, the actual amount of time that they are in operation is limited, and it is therefore desirable that the searchlight can be removably mounted on the vehicle, easily relocated to another vehicle, and stowed inside of the vehicle when not in use. Nevertheless, in removably mounting the searchlight on a surface, it is important that the searchlight be securely installed and that the searchlight be capable of traversing greater than 360° since it will not always be aligned in the same orientation with respect to the car or vehicle each time that it is mounted.

Other representative patents are U.S. Pat. No. 1,637,528 to J. E. Liebrich, U.S. Pat. No. 3,732,537 to W. D. Freemand, U.S. Pat. No. 4,157,531 to H. I. Mont, U.S. Pat. No. 4,722,030 to S. H. Bowden, U.S. Pat. No. 4,725,238 to B. A. Meyer, U.S. Pat. No. 4,987,522 to T. Miyano et al, U.S. Pat. No. 5,034,860 to G. A. Bryant et al, U.S. Pat. No. 5,070,434 to M. J. Suman et al and U.S. Pat. No. 5,217,291 to B. A. Meyer.

SUMMARY OF INVENTION

It is therefore an object of the present invention to provide for a novel and improved searchlight apparatus that can be remotely operated by wireless control.

It is another object of the present invention to provide for a novel and improved searchlight apparatus which can be removably mounted on different surfaces and controlled in operation in a reliable and efficient manner.

It is a further object of the present invention to provide in a searchlight apparatus for a novel and improved mounting base for releasable attachment to different surfaces, including but not limited to the roof of a motor vehicle or a boat deck and be controlled from a location remote from the searchlight apparatus.

A searchlight apparatus in accordance with the present invention includes a lamp unit mounted in a housing which has a motor-driven vertical drive mechanism for tilting the lamp unit in a vertical direction and a motor-driven horizontal drive mechanism for rotating the lamp unit in a horizontal direction through at least 360°. Providing lamp movement through at least 360° and preferably beyond is particularly advantageous in that it permits installation without regard to orientation. Thus, the user does not have to worry about mounting the unit so that it generally faces the direction of interest. It can be mounted in any orientation. The lamp housing includes a base support unit and attaching means on the base support unit for releasably attaching the base support unit to a generally flat surface with the lamp unit being both rotatable and tiltable with respect to the base support unit.

The vertical and horizontal drive mechanisms are remote-controlled via a separate transmitter and receiver mounted in the housing so that, for example, the lamp housing may be removably positioned on the roof of a vehicle and the position of the lamp unit radio controlled via the transmitter either inside of the vehicle while the vehicle is in operation or from a distance from the vehicle when the vehicle is parked.

The capability of remote control while the operator of the vehicle is away from the vehicle is particularly advantageous for security reasons. For example, when the searchlight apparatus of the present invention is installed in an automobile or on the roof of the automobile parked in a dimly lit parking lot, the operator may turn the searchlight on and survey the lot prior to venturing close to the automobile. Alternatively, where the apparatus may be installed in a home, it may be similarly operated from inside the home to survey the yard, driveway, etc.

The remote control is preferably provided by a hand-held multichannel radio transmitter similar to a model airplane controller and a locally mounted receiver contained within the lamp housing. The transmitter and receiver circuits control the motors in the lamp housing for vertical and horizontal rotational movement of the lamp and the power to the lamp filament.

In one form of the present invention, the attaching means includes a base plate with fasteners for connecting the plate flush with the roof or other surface, the base plate including a shoe with the base support unit inserted into the shoe and a removable stop retains the base support unit in the shoe against accidental displacement or removal. In another form of invention, the attaching means includes a rubber boot on the base support unit and means for drawing the boot into vacuum-tight engagement with the roof or other surface. Most desirably the boot is provided in both forms of the invention so that when the base unit is inserted into the shoe will both cushion any shocks and discourage shifting or movement of the lamp housing with respect to the shoe.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 3 is a cross-sectional view of a preferred form of lamp housing in accordance with the present invention;

FIG. 4 is another cross-sectional view of the preferred form of lamp housing taken at right angles to that of FIG. 3;

FIG. 5 is a somewhat perspective, exploded view of a portion of the horizontal drive mechanism employed in the lamp housing of the present invention;

FIG. 8 is a schematic diagram of the receiver circuit in accordance with the invention which controls vertical tilting and horizontal rotational movement of the lamp housing.

DETAILED DESCRIPTION OF PREFERRED EMBODIMENT

Figure 1:
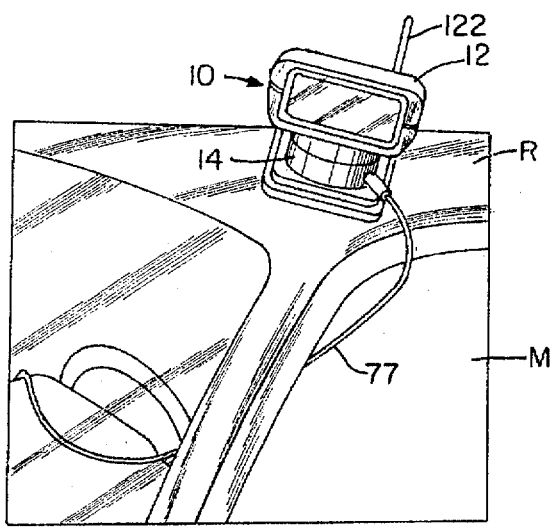
FIG. 1 is a somewhat perspective view of a preferred form of invention mounted on the roof of a vehicle.

Referring in detail to the drawings, as shown in FIGS. 1 to 8, a preferred form of searchlight apparatus 10 is broadly comprised of a stream-lined, low profile, housing 12 and a lower base support unit 14 with releasable attachment means 16 on a bottom surface of the base support unit 14. The attachment means 16 serves to releasably mount the apparatus on a substantially flat surface, such as, a roof R of a motor vehicle or on a boat deck.

As shown in FIGS. 2 to 5, the upper housing 12 defines a forward enclosure 18 of generally rectangular configuration which slopes rearwardly into a smaller enclosure section 19 for drive motors 20 and 21. For the purpose of illustration but not limitation, one conventional type of drive motor is the Model NF 213G manufactured and sold by Johnson Electric Co. of Hong Kong and which can be employed as the reversible drive for each of the motors 20 and 21. The enclosure 18 is recessed to receive a generally rectangular lamp socket 24 for insertion of a sealed, commercially available spotlight B. A cap 28 surrounds the entrance to the socket 24 and engages a flange F on the beam B in a conventional manner to retain the beam B in a secure position within the socket 24. A removable lens 22 is attached to the cap 28 over the spotlight B.

The socket 24 has a pair of aligned bearings 26 on opposite sides which are journaled in opposite sides of the housing 12 so that the socket is tiltable in a vertical direction about a common horizontal axis through the bearings 26 under the control of a vertical drive mechanism. The vertical drive mechanism includes a rack member 30 extending in a vertical direction along a convex wall 32 of the socket 24. One of the drive motors 20 is mounted on an L-shaped vertical support wall 34 within the upper housing 12 and includes a pinion gear 35 on an output shaft, not shown, projecting from the motor drive 20 through the support wall 34 to intermeshingly engage the gear 30.

The base support unit 14 is in the form of a hollow, generally rectangular casing including outer peripheral, vertical walls 38 and a top horizontal wall 40 upon which is surmounted an annular gear 42. The gear 42 is provided with gear teeth 43, and an annular groove 44 is dispersed in outer surrounding relation to the gear 42. A radial stop 45 is in the form of an upstanding rib in the groove 44, and a series of bolt holes in the groove are aligned with bores in the top wall 40 to receive fasteners 48 in order to mount the gear 42 in fixed relation to the base support unit 14. In turn, a lower extension wall 46 of the lamp housing 12 surrounds the groove 44 and is provided with bosses 50. The drive motor 21 is mounted on a horizontal support plate 52 which is of semi-circular configuration and provided with spaced bolt holes 54 aligned with the bosses 50 on the inner wall of the lamp housing 12 to receive fasteners 56. A pinion 58 projects downwardly from an output shaft, not shown, on the drive motor 21 through an opening 59 in the support plate 52 for intermeshing engagement with the gear teeth 43. The support plate 52 is journaled with respect to the gear 42 and the top wall of the base, and the upper housing 12 includes a downwardly depending skirt 60 which encircles the upper end of the base 14.

When the pinion 58 is rotated by the drive motor 21, it will cause the entire upper housing 12 to rotate with respect to the base support unit 14. It is highly desirable that the upper housing 12 be free to rotate greater than 360° with respect to the base support unit 14 and, to this end, a follower pin 64 includes an enlarged head 63 which projects downwardly from the upper housing through a circumferential slot 65 in the support plate 52 with the head 63 riding in the annular groove 44. When the drive motor 21 rotates the pinion 58 in one direction around the gear teeth 43, the head 63 will move into engagement with the stop 45 but the upper housing 12 and attached support plate 52 will be free to continue rotating, since the slot 65 can continue its advancement until the pin 64 reaches the end of the slot 65. Conversely, when the pinion 58 is rotated in the opposite direction, the support plate 52 and upper housing 12 will be free to rotate through substantially 360° until the pin 62 moves into engagement with the opposite side of the stop 45. Once again, however, the slot 62 will permit the support plate 52 and upper housing 12 to continue rotation with respect to the stop member 45 so that the upper housing 12 is free to rotate through greater than 360° in either direction.

A handle in the form of a generally U-shaped bracket 66 has downwardly depending legs 67 and an upper hand grip portion 68. Lower ends of the legs 67 are provided with openings to receive the bearing mounts 69 on opposite sides of the housing 12.

Figure 2:
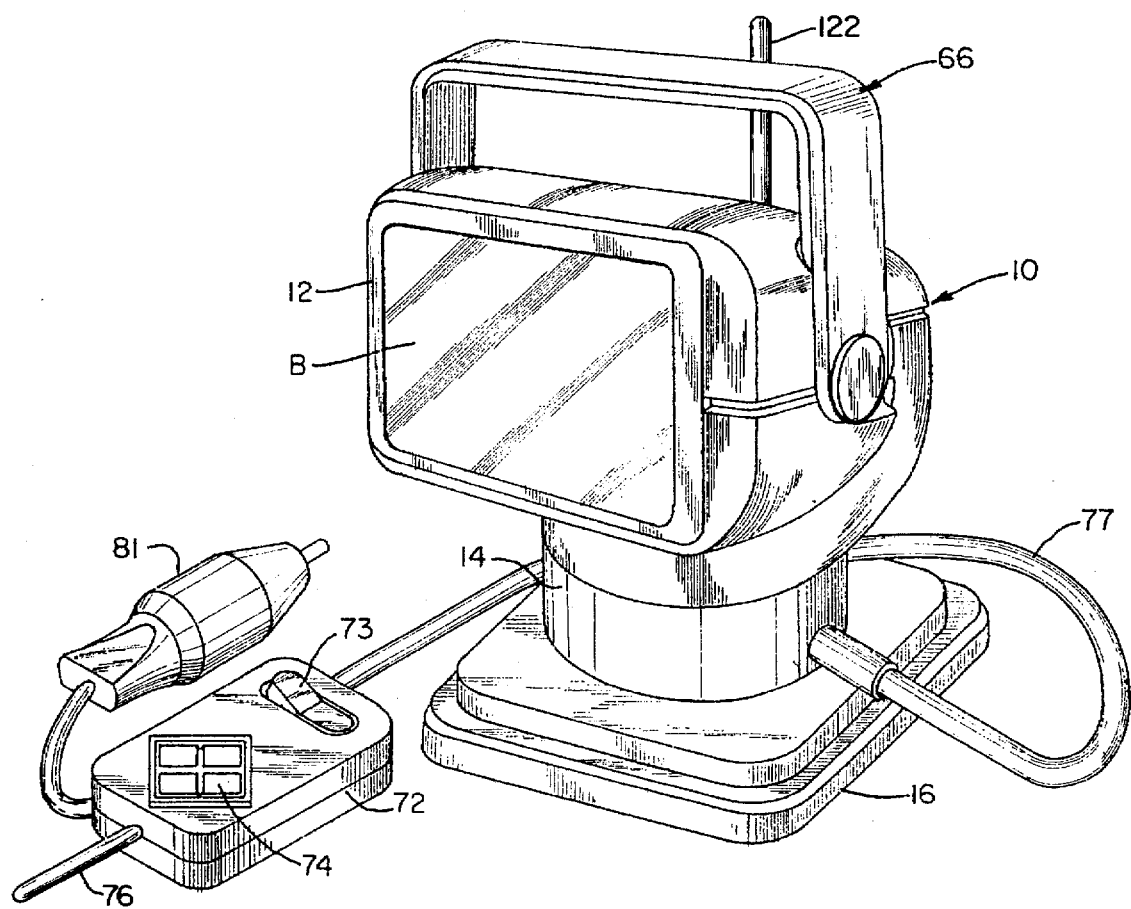
FIG. 2 is another enlarged perspective view of the preferred form of invention.

Referring to FIGS. 1, 2, 7 and 8, in order to remotely control the drive motors 20 and 21, a three channel wireless radio transmitter 72 and a three channel receiver 120 are used. One channel is provided for turning power to the lamp filament in the spotlight B on and off and "on" standby power to the motors 20 and 21. One channel is used for rotating the socket 24 about the horizontal axis through bearings 26 via drive motor 20, and the third channel is used for rotating the housing 12 about the vertical axis via drive motor 21. The electrical control transmitter box 72 includes an on/off switch 73 and a four-way directional control switch 74, and supports an antenna as shown in FIG. 2. The transmitter 72 is powered by a replaceable internal power supply; for example, a 9-volt battery.

Figure 7:
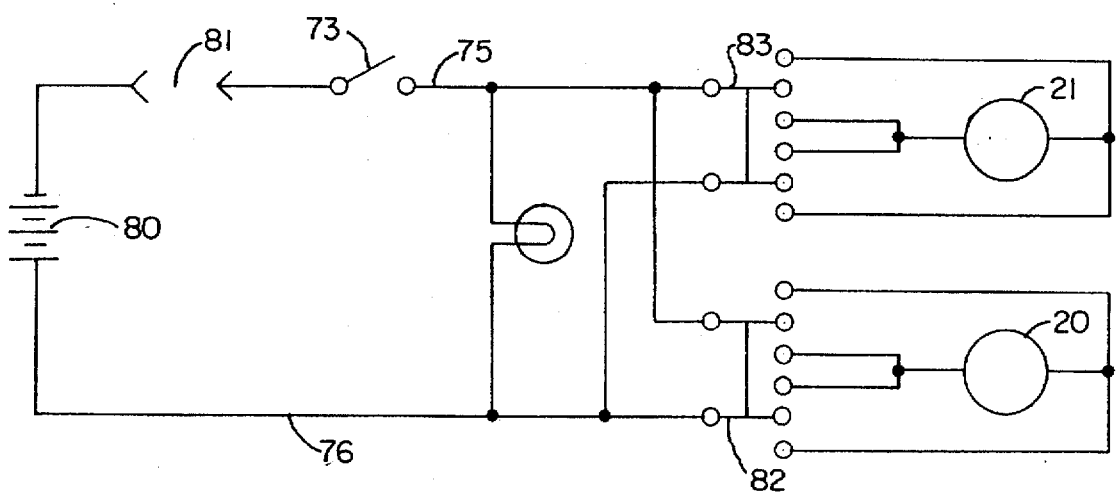
FIG. 7 is a schematic diagram of the transmitter in accordance with the present invention.

A preferred electrical circuit for the transmitter 72 is shown in FIG. 7. This circuit is a three channel RF transmitter which generates a RF signal output at antenna 76 on one channel when switch S4 (toggle switch 73 in FIG. 2) is depressed. Second and third channel signals are actuated by depressing S1, S2, S6 or S9 (corresponding to four-way control switch 74 in FIG. 2) in order to rotate or elevate the upper housing 12. By way of illustration only, switches S1 and S2 may control clockwise and counterclockwise rotation of the housing 12 via drive motor 21. Similarly, switches S6 and S9 may control the rotation of the socket 24 and hence the elevation of the spotlight beam.

Referring now to FIGS. 3 and 8, the receiver 120 is housed behind the spotlight B in the enclosure section 19. The antenna 122 for the receiver 120 is mounted to the top of the smaller enclosure section 19. Power to the receiver 120 may be provided via leads 75 in cable 77 (FIG. 4) and plug 81 (FIG. 2) from an automobile or boat battery. Alternatively, and as shown in FIG. 8, for nonvehicular applications power may be changed to 120 Vac, provided by connecting a suitable plug to a convenient wall outlet. Although the schematic in FIG. 8 shows a 120 Vac supply, it is to be understood and should be readily apparent to those skilled in the art that power may be supplied by any suitable means through an appropriate power conversion apparatus.

Electrical leads 75 extend from a power supply, such as, a car battery or a common 120 Vac outlet, depending on the installation, through a cable 77 into the interior of the base support unit 14. The electrical power is selectively connected, via appropriate switches in radio receiver 120, to the drive motors 20, 21 and to the spotlight B for the purpose of controlling the on/off position of the spotlight B and directional movement of the upper housing 12 and lamp socket 24.

The receiver 120 is a conventional three channel RF receiver such as is utilized to control the flight of model aircraft. The receiver is designed to actuate three independent motors or switches depending on the signal present on each channel. Operation of this receiver is conventional and thus will not be discussed in detail. One channel output is coupled through U5A, U5B, and Q3 to relay K1 to supply power to the spotlight B. Actuation of the on/off switch 73 on the transmitter provides the signal to cause Q3 to conduct, energizing rely 1 to complete the power circuit to the lamp LP1 of spotlight B.

The other two channels are dedicated to the drive motors 20 and 21. Accordingly, actuation of the four way switch on the transmitter 72 generates an RF signal at antenna 76 which is received via antenna 122 mounted on the searchlight upper housing 12. The received signal is demodulated and fed to either motor M2 (drive motor 20) or motor M1 (drive motor 21) to elevate the spotlight B or to rotate the housing 12.

Referring now to FIGS. 3 and 4, in the preferred form of invention, the releasable attachment means 16 takes the form of a suction cup 84 of rubber or rubber-like material. The cup 84 is of generally rectangular configuration having upstanding grooves 85 along its outer peripheral walls which receive lower edges of the peripheral walls 38 of the base support unit 14. A crank 86 includes an intermediate offset portion 87 inserted through a control plate 88 which is anchored as at 89 in the center portion of the boot or suction cup 84. A control knob 90 is keyed to one end of the crank 86, as best seen from FIG. 3, so that manual rotation of the crank via the knob 90 will cause the eccentric or offset portion 87 to rotate upwardly from the position illustrated in FIG. 3, and in so doing will raise the central portion of the suction cup 84 thereby forming a vacuum between the suction cup and the surface with which it is engaged so as to releasably attach the entire assembly to the surface. The assembly or apparatus 10 is easily released by rotating the knob 90 to return the crank to its downwardly directed position thereby releasing the seal or vacuum-tight engagement and permitting the assembly to be removed.

Figure 6:
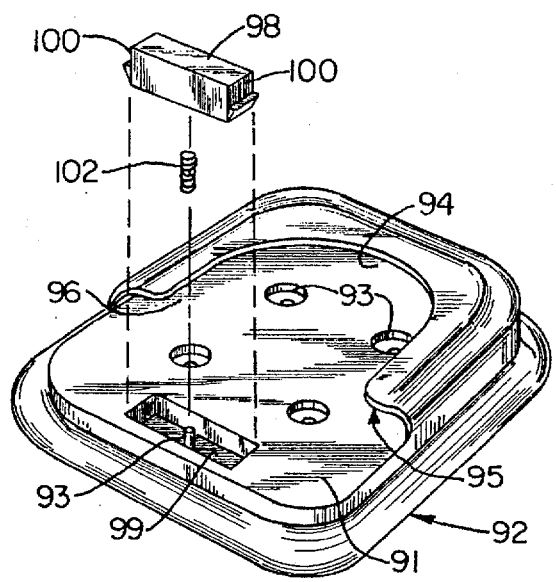
FIG. 6 is an exploded view of one form of attaching device to a surface.

The releasable attachment means 16 as described is merely one form of releasable attachment of the assembly; however, it is of particular utility in that it can also be used in combination with a more permanent form of attachment as illustrated in FIG. 6. Specifically, in FIG. 6, a shoe 92 of generally rectangular configuration includes a substantially flat base plate having a series of bolt holes 93 for permanent connection to a surface to which the searchlight apparatus 10 is to be attached. An upper shelf 94 extends around three sides of the base with an upper generally semi-circular surface portion 95 which defines an open slot or recess as designated at 96 into which the base support unit 14 can be inserted. Specifically, the shoe is dimensioned to provide a slot 96 slightly larger than the width and thickness of the attachment means 16 so as to snugly receive the base support unit 14. A stop element 98 is insertable into a correspondingly shaped opening 99 in the shoe 92 and has opposite ledges 100 movable into snap-fit engagement with correspondingly shaped grooves at opposite ends of the opening 99. The stop element 98 is spring-loaded by a coil spring 102 disposed on an upstanding pin 103 within the opening 99 so as to maintain the stop in snap-fit engagement as described. The stop will abut one edge or side of the base support unit 14 so as to prevent shifting or accidental removal of the searchlight apparatus 10 from the shoe. The releasable attachment means 16 is especially effective when used in combination with the shoe 92 in assuring a tight fit within the shoe and minimizing any shifting or displacement, for example, when the vehicle is in operation. The stop is easily released by depressing slightly and cocking in either direction until the ledges 100 clear the edges of the opening 99.

It will be evident from the foregoing that the shoe 92, as illustrated in FIG. 6, may in itself serve as the releasable attachment means without use of the vacuum cup 16. In this relation, the shoe 92 may be secured to a surface by clamping or a magnetic device instead of the more permanent form of fasteners described. On the other hand, the releasable attachment means 16 as shown in FIGS. 3 and 4 may be utilized either with or without the shoe 92 in releasably mounting the apparatus 10 on another surface, such as, the roof of a vehicle.

In use, it will be appreciated that the portable searchlight apparatus of the invention is readily conformable for use in a variety of applications. When employed with a motor vehicle, it can be easily attached to the roof by the operator from inside the vehicle simply by placing the base support 14 on the roof and actuating the control knob 90 to draw the suction cup 84 into firm engagement with the roof. The cable 77 extends downwardly through a side window to the plug 81 which is inserted into the cigar lighter. The operator can control, via the hand-held transmitter, rotation and tilting of the searchlight from the interior of the vehicle or from any nearby location, within the range of the transmitter. When the searchlight is not in use, it can be easily disengaged as described and stored in the vehicle or trunk of the vehicle. In those applications where it is not necessary or desirable to constantly install and store the searchlight, the more permanent form of attachment as shown in FIG. 6 can be utilized. In addition, the searchlight may be modified in its power requirements as noted above and mounted on the exterior of the owner's home, or in any other convenient location, for nonvehicular use.

It is therefore to be understood that the above and other modifications and changes may be made in the forms of invention herein described without departing from the spirit and scope of the invention as defined by the appended claims and reasonable equivalents thereof.

We claim:

1. A portable searchlight assembly for mounting on a vehicle wherein a lamp unit is mounted in a housing having vertical drive means for tilting said lamp unit in a vertical direction and horizontal drive means for rotating said lamp unit in a horizontal direction, the combination therewith comprising:

a first user controllable remote control means separate from said lamp unit for actuation of said vertical drive means;

a second user controllable remote control means separate from said lamp unit for actuation of said horizontal drive means; and wherein said first and second remote control means comprise a wireless transmitter and receiver each having at least two separate channels, said receiver mounted in said housing, one of said receiver channels being coupled to said vertical drive means and the other of said receiver channels being coupled to said horizontal drive means and wherein said motors can be operated by wireless transmission at remote distances from said lamp unit without electrical connection between said motors and said remote control means.

2. The assembly according to claim 1 further comprising a third user controllable remote control means for remotely actuating electrical power to said lamp unit.

3. The assembly according to claim 2 wherein said user controllable remote control means comprises an RF transmitter and an RF receiver each having at least three channels.

4. The assembly according to claim 1 wherein said user controllable remote control means comprises an RF transmitter and an RF receiver.

5. In a searchlight apparatus for mounting on a vehicle wherein a lamp unit is mounted in a housing having vertical drive means for tilting said lamp unit in a vertical direction and horizontal drive means for rotating said lamp unit in a horizontal direction through at least 360°, the improvement comprising:

a base support member on said housing;

attaching means for releasably attaching said base support member to a substantially flat surface wherein said attaching means includes a base plate, fastener means for connecting said base plate to said surface, said base plate including a shoe with said base support member being inserted into said shoe, and a removable stop member for retaining said base support member in said shoe; and wireless remote control means for controlling vertical and horizontal movement of said searchlight apparatus, said remote control means including an on/off switch and a four-way directional control switch, and a self-contained transmitter wherein said motors can be operated by wireless transmission at remote distances from said housing without electrical connection between said motors and said remote control means, and a receiver mounted within said housing and connected to a power source on said vehicle, said power source being selectively connected to said moors through said receiver, said receiver having at least two separate channels, one of said receiver channels being coupled to said vertical drive means and the other of said receiver channels being coupled to said horizontal drive means.

6. A searchlight apparatus for mounting on the roof of a vehicle comprising in combination:

a lamp housing including a lamp unit mounted therein, vertical drive means including a reversible motor for tilting said lamp unit in a vertical direction;

a base support unit mounted beneath said housing, said housing being journaled on said base support unit, and horizontal drive means interposed between said base support unit and said housing including a reversible drive motor for energizing said horizontal drive means to rotate said housing through greater than 360°;

releasable attaching means on said base support unit for releasably attaching said base support unit and housing to the roof of a motor vehicle without altering the roof itself; and wireless remote control means for selectively energizing each of said electrical motors to independently control vertical movement of said lamp unit and horizontal movement of said housing, said remote control means including a self contained transmitter adapted to be carried by an operator of said vehicle wherein said motors can be operated by wireless transmission both from within said vehicle and at remote distances from said vehicle without electrical connection between said motors and said remote control means, and a receiver mounted within said housing and connected to a power source within said vehicle, said power source being selectively connected to said motors through said receiver, said receiver having at least two separate channels, one of said receiver channels being coupled to said vertical drive means and the other of said receiver channels being coupled to said horizontal drive means.

7. A searchlight apparatus according to claim 6, said horizontal drive means including an annular gear mounted in said base support unit, said electrical motor for said horizontal drive means mounted in said housing above said gear and including a pinion extending downwardly from said electrical motor into intermeshing engagement with said annular gear.

8. A searchlight apparatus according to claim 7, wherein said horizontal drive means is further characterized by an annular groove in outer concentric relation to said annular groove, a stop member disposed in said annular groove, and a follower pin rotatable with said housing and movable through said annular groove when said housing is rotated.

9. A searchlight apparatus according to claim 8, wherein a horizontal support plate for said horizontal drive motor is connected to said housing and includes an elongated slot through which said follower pin extends.

10. A searchlight apparatus according to claim 9, said lamp housing including a handle, said handle being in the form of a generally U-shaped bracket including downwardly extending legs on opposite sides of said housing and an intermediate hand grip spaced above said housing and extending between said legs.

11. In a searchlight apparatus wherein a lamp unit is mounted in a housing having vertical drive means for tilting said lamp unit in a vertical direction and horizontal drive means for rotating said lamp unit in a horizontal direction, the improvement comprising:

a base support member on said housing;

attaching means on said base support member for releasably attaching said base support member to a substantially flat surface, said attaching means including a rubber boot on said base support member, and actuating means engageable with said boot for drawing said boot into vacuum-tight relation to said surface; and wireless remote control means for controlling vertical and horizontal movement of said searchlight apparatus, said remote control means including a self-contained transmitter adapted to be carried by an operator of a motor vehicle wherein said drive means can be operated by wireless transmission both from within said vehicle and at remote distances from said vehicle without electrical connection between said drive means and said remote control means, and having an on/off switch and a four-way directional control switch, and a receiver mounted within said housing.

12. In a searchlight apparatus according to claim 11, said boot including an upwardly directed, outer peripheral lip engageable with an outer peripheral surface of said base support member.

13. In a searchlight apparatus according to claim 11, said actuating means including a manual control member disposed within said base support unit to control flexing of said boot into and out of engagement with said surface.

* * * * *

UNITED STATES PATENT AND TRADEMARK OFFICE
CERTIFICATE OF CORRECTION

PATENT NO. : 5,673,989
DATED : 7 October, 1997
INVENTOR(S) : Gohl, G. L. et al

It is certified that error appears in the above-indentified patent and that said Letters Patent is hereby corrected as shown below:

| Column | Line No. | |
|--------|----------|---|
| 6 | 50 | After "direction", insert -- through at least 360° --. |
| 6 | 67 | After "means", insert -- to independently control rotation and tilting of said lamp unit --. |

Signed and Sealed this

Tenth Day of February, 1998

Attest:

BRUCE LEHMAN

Attesting Officer

Commissioner of Patents and Trademarks